(12) United States Patent
Suganuma (10) Patent No.: US 7,916,389 B2
(45) Date of Patent: Mar. 29, 2011

(54) POLARIZER AND MANUFACTURING METHOD THEREOF

(75) Inventor: Takayoshi Suganuma, Kawaguchi (JP)

(73) Assignee: Enplas Corporation, Saitama (JP)

( * ) Notice: Subject to any disclaimer, the term of this patent is extended or adjusted under 35 U.S.C. 154(b) by 668 days.

(21) Appl. No.: 11/977,642

(22) Filed: Oct. 25, 2007

(65) Prior Publication Data

US 2008/0100914 A1  May 1, 2008

(30) Foreign Application Priority Data

Oct. 27, 2006  (JP) .................................. 2006-292597

(51) Int. Cl.
G02B 5/30 (2006.01)
(52) U.S. Cl. ........................................ 359/486; 359/576
(58) Field of Classification Search .................. 359/486, 359/576
See application file for complete search history.

(56) References Cited

U.S. PATENT DOCUMENTS

| | | | | |
|---|---|---|---|---|
| 6,122,103 | A * | 9/2000 | Perkins et al. ................. | 359/486 |
| 6,788,461 | B2 * | 9/2004 | Kurtz et al. .................... | 359/486 |
| 2002/0090521 | A1 * | 7/2002 | Nakajima et al. ............. | 428/446 |

FOREIGN PATENT DOCUMENTS

| | | |
|---|---|---|
| JP | 05-288929 | 5/1993 |
| JP | 06-322278 | 11/1994 |
| JP | 09-304620 | 11/1997 |
| JP | 2001-201163 | 1/2001 |
| JP | 2003-292795 | 10/2003 |
| JP | 2006-084776 | 3/2006 |
| JP | 2006-178418 | 7/2006 |

* cited by examiner

*Primary Examiner* — Lee Fineman (74) *Attorney, Agent, or Firm* — DLA Piper LLP (US)

(57) ABSTRACT

A polarizer includes including a translucent substrate a diffraction grating which is formed on the translucent substrate and which has a plurality of convex portions that are aligned so as to have a frequency which is equal to or less than a wavelength of light to be used, and in which each of the plurality of convex portions includes an alternating layer formed of high-refractive-index layers and low-refractive-index layers, and an intermediate-refractive-index region which is formed at a position between the convex portions that are adjacent to each other in the diffraction grating, so as to have a portion buried in the translucent substrate and which has a refractive index which is higher than a refractive index of the low-refractive-index layer and which is lower than a refractive index of the high-refractive-index layer.

4 Claims, 8 Drawing Sheets

POLARIZER AND MANUFACTURING METHOD THEREOF

BACKGROUND OF THE INVENTION

1. Field of the Invention

The present invention relates to a polarizer and a manufacturing method thereof. In particular, it relates to a polarizer which is applied to a crystal liquid display device, an optical pick-up optical system, an optical element for optical communication or the like and which is suitable for effective utilization of reflected light, and a manufacturing method thereof.

2. Description of the Related Art

Generally speaking, a polarizer is known as an optical element which has a function of transmitting only linearly polarized light which is polarized in one direction and absorbing or reflecting linearly polarized light which is polarized in the direction perpendicular to the one direction. However, polarizers can be classified into multiple types depending on the configuration and the function thereof. In addition, since the features and characteristics for polarizers greatly differ depending on the type, suitable applications for them are also different.

Among these several types, polarizers of well known types are: a dye doped polymer polarizer which is manufactured by dispersing pigments of dichroic dye such as iodine in a high molecular weight film and stretching the film in a uniaxial direction; a doped glass-type polarizer which is manufactured by doping metal particulates such as silver on a glass and stretching the glass in a uniaxial direction; a metal wire polarizer which is made from metal wire having a periodic structure of a size which is equal to or lessr than wavelength, and a birefringent multi-layered film-type polarizer which utilizes multiple layer interference of a high molecular weight film having birefringence, and the like.

These polarizers of well known types are disclosed, for example, in Patent Literatures 1 to 5.

Specifically, Patent Literature 1 discloses a dye doped polymer polarizer as well as the manufacturing method thereof. According to the manufacturing method as disclosed in Patent Literature 1, a dye doped polymer polarizer is manufactured by adsorbing dichroic dye such as iodine in a macromolecule so as to form a thin film, and subsequently stretching the thin film in a uniaxial direction.

In addition, Patent Literature 2 discloses a metal wire polarizer as well as the manufacturing method thereof. According to the manufacturing method disclosed in Patent Literature 2, a reflective polarizer is manufactured by forming a metal wire having a periodic structure of a sub-wavelength size or less on a substrate.

Like Patent Literature 2, Patent Literature 3 discloses a metal wire polarizer as well as the manufacturing method thereof. According to the manufacturing method disclosed in Patent Literature 3, a reflective wire grid polarizer is manufactured through the use of dry etching while masking a polymer formed by the nano-imprint process.

In addition, Patent Literature 4 discloses a doped glass-type polarizer as well as the manufacturing method thereof. According to the manufacturing method disclosed in Patent Literature 4, a polarizer is manufactured by doping metal particulates such as cupper and silver in a glass and stretching the glass in a uniaxial direction.

Still further, Patent Literature 5 discloses a birefringent multi-layered film-type polarizer as well as the manufacturing method thereof. According to the manufacturing method disclosed in Patent Literature 5, a reflective polarizer is manufactured by laminating numbers of two types of high molecular weight films which have different refractive indexes on a substrate.

[Patent Literature 1] Japanese Patent Unexamined Publication No. Heisei 5-288929

[Patent Literature 2] Japanese Patent Unexamined Publication No. Heisei 9-304620

[Patent Literature 3] Japanese Patent Unexamined Publication No. 2006-84776

[Patent Literature 4] Published Japanese translation of a PCT Application 2001-501163

[Patent Literature 5] Japanese Patent Unexamined Publication No. 2006-178418

SUMMARY OF THE INVENTION

It is certain that the manufacturing method disclosed in Patent Literature 1 has an advantage that a polarizer with a large area can be manufactured at an inexpensive cost. However, a polarizer which can be manufactured by the method is only a so called absorbing polarizer which transmits TE polarized light only and absorbs TM polarized light, and cannot be applied to a reflective polarizer reflects TM light so as to re-use it.

In addition, in the manufacturing method disclosed in Patent Literature 2, since dry etching is performed using a micro-lithography technology and a vacuum process, it is difficult to manufacture a polarizer at an inexpensive cost in large quantity.

In addition, in the manufacturing method disclosed in Patent Literature 3, a vacuum plasma device is used for dry etching, the method is hardly advantageous in terms of cost.

Still further, since a polarizer manufactured by the manufacturing method disclosed in Patent Literature 4 is an absorbing polarizer, like Patent Literature 1, a reflective polarizer cannot be realized.

Still further, the manufacturing method disclosed in Patent Literature 5 has a disadvantage that a thus manufactured polarizer has uneven polarization characteristic depending on positions because of difficulty in enhancing adhesiveness between high molecular weight thin films and because of uneven force applied to the high molecular weight film when the film is stretched in a uniaxial direction.

The present invention has been achieved in view of the foregoing problems in such conventional arts, and an object of the present invention is to provide a reflective polarizer of high performance which can be manufactured with ease and with low cost and a manufacturing method thereof. Another object is to provide a reflective polarizer and a manufacturing method thereof which enables manufacturing a reflective polarizer of high performance inexpensively and easily.

To accomplish the objects as described above, a polarizer according to the first aspect of the present invention includes: a translucent substrate; a diffraction grating which is formed on the translucent substrate, which has a plurality of convex portions that are aligned so as to have a frequency which is equal to or less than a wavelength to be used, and wherein each of the plurality of is made from an alternating layer consisting of high-refractive-index layers and low-refractive-index layers; and an intermediate-refractive-index region which is formed so as to have a portion buried in the translucent substrate at a position between the convex portions that are adjacent to each other in the diffraction grating, and which has a refractive index which is higher than a refractive index of the low-refractive-index layer and which is lower than a refractive index of the high-refractive-index layer.

In addition, according to the first aspect of the present invention, the polarizer has a configuration suitable for manufacture through the use of a thermal imprinting process, which enables manufacturing a reflective polarizer of high performance inexpensively and easily through the use of a thermal imprinting process.

A polarizer according to the first aspect may be configured such that both a lowermost layer and an uppermost layer of the convex portions are the high-refractive-index layers.

In addition, this configuration enables realizing a reflective polarizer without fail.

In addition, a polarizer according to the first aspect may be configured such that the translucent substrate, the high-refractive-index layer, the low-refractive-index layer and the intermediate-refractive-index region are formed from a same high molecular weight polymer.

In addition, this configuration enables further reducing a manufacturing cost as well as enabling enhancing adhesive force between the translucent substrate and the alternating layer, adhesive force between the high-refractive-index layer in the low-refractive-index layer in the alternating layer and adhesive force between the translucent substrate and the intermediate-refractive-index region, and thereby enabling manufacturing a polarizer with excellent durability and resultant long-term reliability.

Still further, a manufacturing method of a polarizer according to the second aspect of the present invention is a manufacturing method of a polarizer, the polarizer including: a translucent substrate; a diffraction grating which is formed on the translucent substrate, which has a plurality of convex portions that are aligned so as to have a frequency which is equal to or less than a wavelength to be used, and wherein each of the plurality of is made from an alternating layer consisting of high-refractive-index layers and low-refractive-index layers; and an intermediate-refractive-index region which is formed so as to have a portion buried in the translucent substrate at a position between the convex portions that are adjacent to each other in the diffraction grating, and which has a refractive index which is higher than a refractive index of the low-refractive-index layer and which is lower than a refractive index of the high-refractive-index layer, and the manufacturing method including the steps of: laminating alternately and repeatedly a high-refractive-index high molecular weight film made from a high molecular weight polymer in which microparticles are dispersed and a low-refractive-index high molecular weight polymer made from a high molecular weight film in which microparticles are dispersed on the film-like translucent substrate made from a high molecular weight polymer; and subsequently transferring a mold shape to the high-refractive-index high molecular weight film and the low-refractive-index high molecular weight film which have been laminated on the translucent substrate through the use of a thermal imprinting process.

In addition, according to the second aspect of the present invention, enables manufacturing a reflective polarizer of high performance inexpensively and easily through the use of a thermal imprinting process.

As described above, the present invention enables manufacturing a reflective polarizer of high performance with low cost and with ease.

DETAILED DESCRIPTION OF THE PREFERRED EMBODIMENT

Embodiments of a polarizer and a manufacturing method thereof according to the present invention will now be described with reference to FIGS. 1 to 16.
First Basic Principle First, the first basic principle for a polarizer according to the present embodiment will be described with reference to FIGS. 1 and 2.

Figure 1:
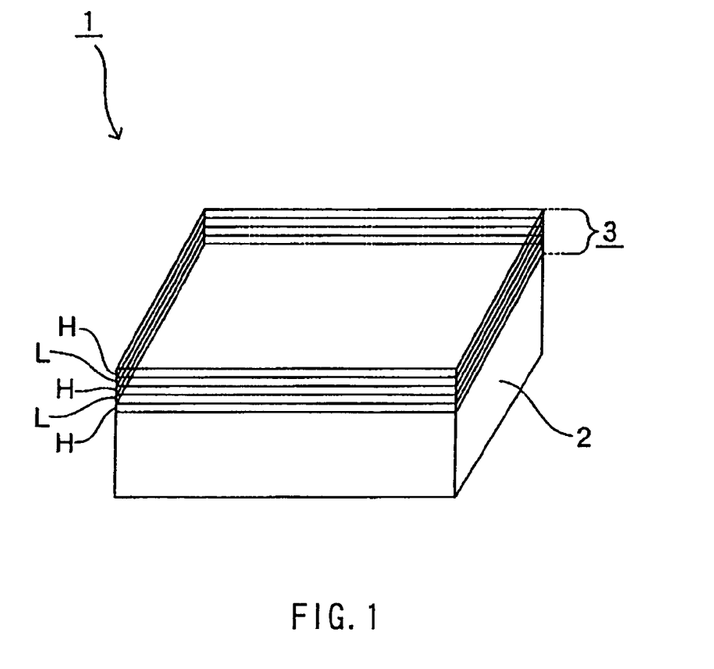
FIG. 1 illustrates an example of a thin film laminated structure which is applied to a polarizer according to the present invention.

FIG. 1 illustrates an example of a thin film laminated structure 1 which is applied to a polarizer according to the present embodiment. The thin film laminated structure 1 includes a translucent substrate 2 which is formed of resin or the like and which has a predetermined thickness, and a multi-layered film structure 3 which is formed from 5 layers in total and which is formed on one of the surfaces (the top surface in FIG. 1) of the substrate 2 in the thickness direction thereof (in the vertical direction of FIG. 1).

The multi-layered film structure 3 is formed by alternately and repeatedly laminating two types of thin films H, L which are formed of resin or dielectric material and which have different refractive indexes in the thickness direction of the substrate 2. Of these two types of thin films H, L, one thin film H is a high-refractive-index layer H which has a relatively high refractive index, and the other thin film L is a low-refractive-index layer L which has a relatively low refractive index.

The thin film laminated structure 1 configures a mirror having high reflectance because of the configuration in which a high-refractive-index layer H is formed as the immediately upper layer on the substrate 2 (the lowermost layer in the multi-layered film structure 3), and a high-refractive-index layer H is formed as the uppermost layer in the multi-layered film structure 3, that is, at the interface between the multi-layered film structure 3 and the layer of air. Such configuration is known as a configuration suitable for a reflective polarizer. Meanwhile, the number of layers of the multi-layered film structure 3 in FIG. 1 is 5. The more the number of layers of the multi-layered film structure 3 is, in the wider bandwidth (light wavelength) high reflectance can be achieved. Provided that, in order for such configuration to be applied to a polarizer, the optical film thickness of each of the high-refractive-index layer H and the low-refractive-index layer L has to be one fourth of each wavelength of light to be used.

Figure 2:
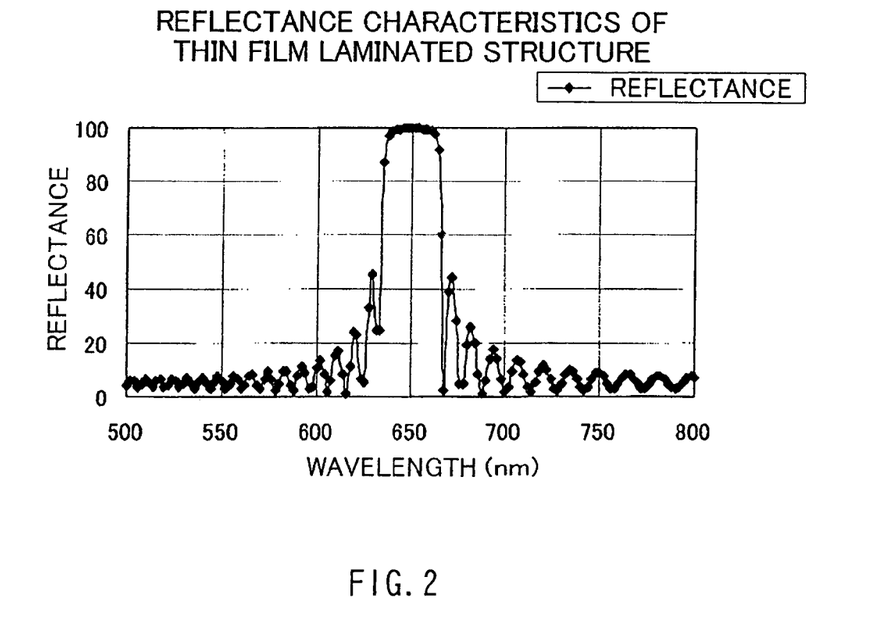
FIG. 2 is a graph showing a calculation result of reflectance for a thin film laminated structure in which a multi-layered structure formed of 111 layers in total is formed.

FIG. 2 herein shows a calculation result of reflectance, in the wavelength range of 500 nm to 800 nm, for the thin film laminated structure 1 in which the multi-layered film structure 3 formed of total 111 layers of the high-refractive-index layers H of which the refractive index nH is nH=1.61 and the low-refractive-index layers L of which the refractive index nL is nL=1.51 is formed on the translucent substrate 2 of which the refractive index nS is nS=1.5146. Note that the thin film laminated structure 1 which is used in the calculation of reflectance has a similar configuration as that shown in FIG. 1 in which a high-refractive-index layer H is formed as the immediately upper layer on the substrate 2 and a high-refractive-index layer H is also formed as the uppermost layer. In addition, for the thin film laminated structure 1, the wavelength of light to be used is assumed to be 650 nm, and subsequently the optical film thickness of each of the high-refractive-index layer H and the low-refractive-index layer L is set to one fourth of 650 nm, i.e., the wavelength of light to be used. Accordingly, the physical film thickness of the high-refractive-index layer H is set to be 100.93 nm which is a value determined by dividing the optical film thickness, i.e., one fourth of 650 nm, by the refractive index of the high-refractive-index layer H. In the same way, the physical film thickness of the low-refractive-index layer L is set to be 107.62 nm which is a value determined by dividing the optical film thickness, i.e., one fourth of 650 nm, by the refractive index of the low-refractive-index layer L. Calculation of the matrices which represent admittance of the individual layers in such thin film laminated structure leads to the calculation result as shown in FIG. 2.

As shown in FIG. 2, it is found that the wavelength range in which reflectance is 50% or more is within a range of plus or minus approx. 30 nm of the center wavelength 650 nm. Although this wavelength range 30 nm is not wide enough for some application, and it is possible to increase the wavelength range by only increasing the number of layers of the multi-layered structure.

In the meantime, it is known that as the difference between the refractive index of the high-refractive-index layer H and the refractive index of the low-refractive-index layer L increases, the number of layers with which high reflectance in a wide wavelength range can be realized decreases. Generally speaking, in many cases of a dielectric multi-layered filter, $Ta_2O_5$ and $TiO_2$ are employed as a film formation material for the high-refractive-index layer H, and $SiO_2$ is employed as a material for the low-refractive-index layer L. In this case, it is also possible to set the difference in refractive index Δn between the high-refractive-index layer H and the low-refractive-index layer L to 0.8 or more.

It is generally known, however, that in the case where the high-refractive-index layer H and the low-refractive-index layer L are formed of an inexpensive high molecular weight substance it is generally difficult to set a large difference in refractive index between both layers. However, if a difference in refractive index is approx. 0.1, a polarizer as described above can be realized.

Second Basic Principle

The second basic principle for the polarizer according to the present embodiment will now be described with reference to FIG. 3.

Figure 3:
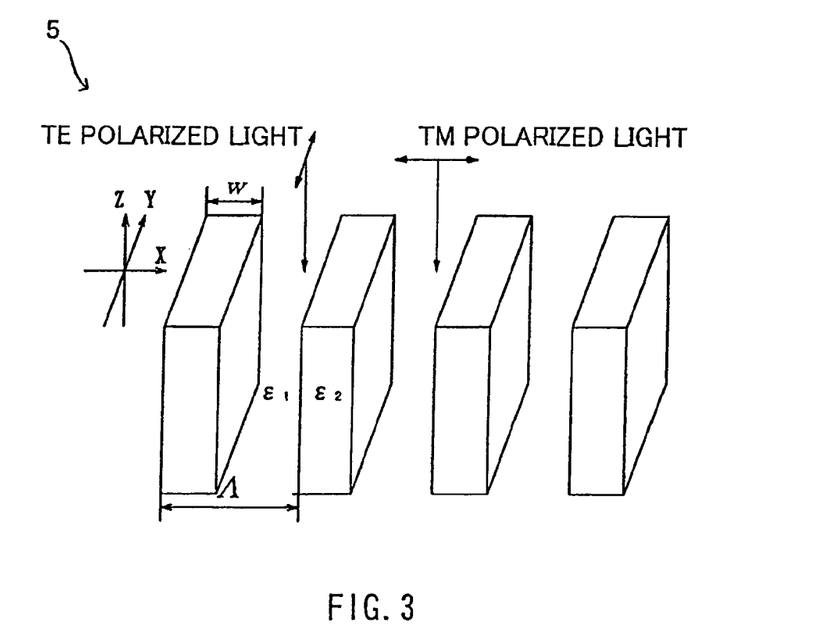
FIG. 3 illustrates an example of a periodic structure of a sub-wavelength size which is applied to the polarizer according to the present invention.

FIG. 3 illustrates an example of a periodic structure 5 (diffraction grating) of a sub-wavelength size which is applied to a polarizer according to the present embodiment. The periodic structure 5 is formed by alternately and infinitely aligning media which have permittivity ϵ1 and media which have permittivity ϵ2 in the X-axis direction (the horizontal direction in FIG. 3) which is the period direction. A period size Λ of the periodic structure 5 is set to a size which is significantly smaller compared to the light wavelength. Note that the period size which is equal to or less than the light wavelength is referred to as a sub-wavelength size. In addition, the media which have permittivity ϵ1, ϵ2 infinitely continue in the Y-axis direction.

Let us assume the case where light is incident to such periodic structure 5 in the Z-axis direction (the vertical direction in FIG. 3). In this case, according to the primary effective medium theory, it is known that an average medium component ϵ∥ in the X-axis direction is expressed as Equation (1) as below, and an average medium component ϵ⊥ in the Z-axis direction is expressed as Equation (2) as below:

$$\epsilon\|(0)=(1-f)\cdot\epsilon 1+f\epsilon 2 \tag{1}$$

$$1/\epsilon\perp(0)=(1-f)/\epsilon 1+f/\epsilon 2 \tag{2}$$

Provided that f in Equations (1) and (2) is a parameter referred to as a filling ratio. The filling ratio f can be expressed as f=w/Λ using the dimension w in the X-axis direction of the medium which has permittivity ϵ2 and the size of the period Λ. What is meant by these equations is that anisotropy of the refractive index which is generated in the periodic structure 5 can be controlled by the difference between ϵ1 and ϵ2 and the selected f value. For example, as shown in FIG. 3, it is possible to reflect TE polarized light and transmit TM polarized light which are incident to the periodic structure 5 in the Z-axis direction.

Specific Configuration

Figure 4:
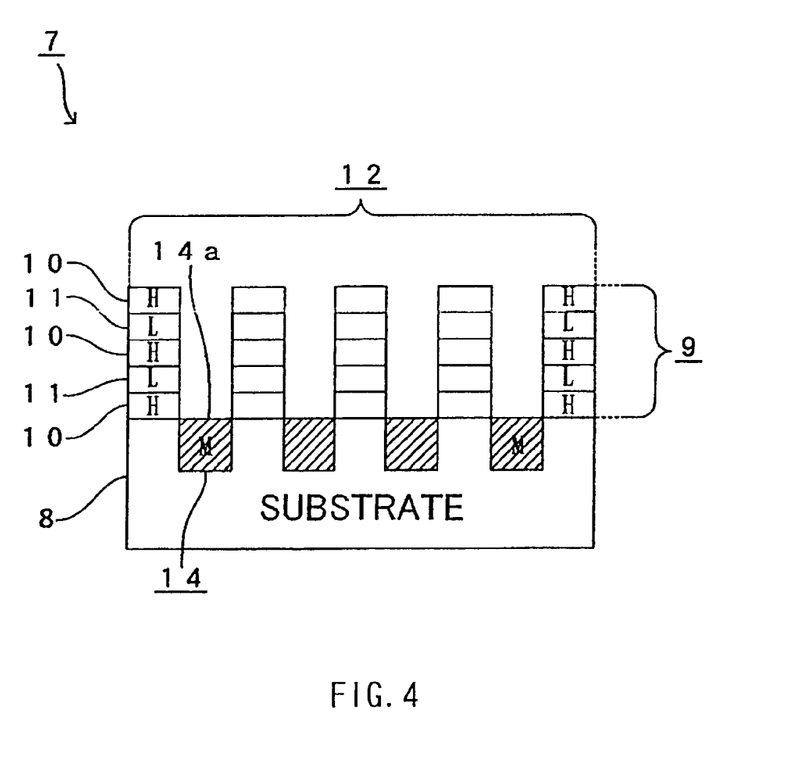
FIG. 4 is a horizontal cross sectional view schematically showing an embodiment of the polarizer according to the present invention.
Figure 5:
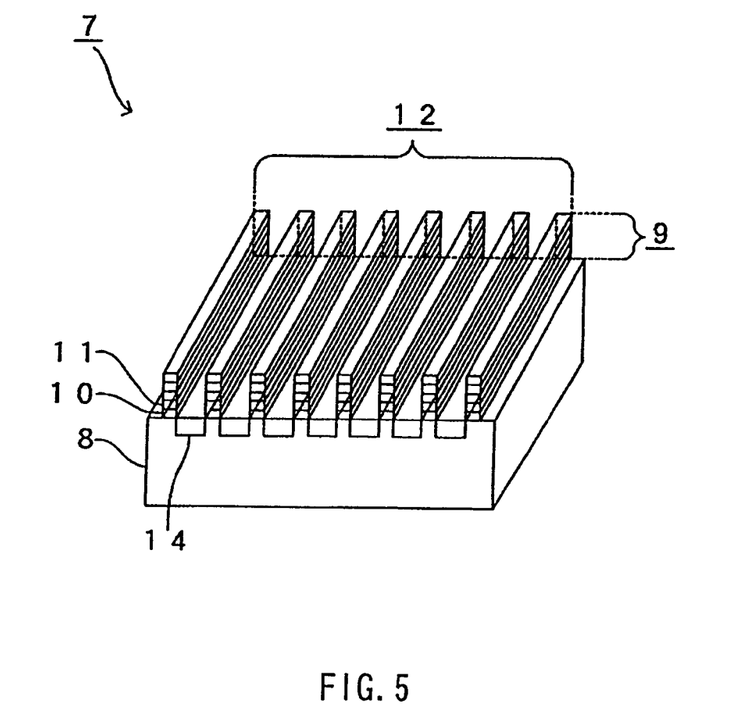
FIG. 5 is a perspective view showing the embodiment of the polarizer according to the present invention.

Next, FIG. 4 and FIG. 5 show a polarizer 7 according to the present embodiment to which the first basic principle and the second basic principle as described above have been applied.

The polarizer 7 has a translucent substrate 8 (translucent substrate) which is formed of resin or the like, like one for the substrate 2 shown in FIG. 1, and which has a predetermined thickness. A diffraction grating 12 in which a plurality of convex portions 9 are aligned so as to have a constant period is formed on one of the surfaces (the top surface in FIGS. 4 and 5) in the thickness direction of the substrate 8.

Each of the convex portions 9 in the diffraction grating 12, like the multi-layered film structure 3 shown in FIG. 1; is formed by an alternating layer formed of high-refractive-index layers 10 indicated with an English character H in FIG. 4 and low-refractive-index layers 11 indicated with an English character L in FIG. 4. In addition, both the immediately upper layer of the substrate 8 (i.e., the lowermost layer of the convex portions 9) and the uppermost layer of the convex portions 9 are the high-refractive-index layers 10.

In addition, the period size A of the diffraction grating 12 as shown in FIG. 4 is formed to have a size which is equal to or less than the wavelength of light to be used (sub-wavelength size), like the periodic structure 5 shown in FIG. 3.

Still further, an intermediate-refractive-index region 14 indicated with an English character M in FIG. 4 is formed at a position between the convex portions 9 that are adjacent to each other in the diffraction grating 12. A top surface 14a of the intermediate-refractive-index region 14 is exposed, and all other portions than the top surface 14a thereof are buried in the substrate 8 from the surface thereof.

The refractive index of the intermediate-refractive-index region 14 is an intermediate refractive index which is higher than the refractive index of the low-refractive-index layer 11 and lower than the refractive index of the high-refractive-index layer 10. As a matter of course, this includes a case where the refractive index of the intermediate-refractive-index region 14 is nM=(nH+nL)/2, which is the exact intermediate value of the refractive index nH of the high-refractive-index layer 10 and the refractive index nL of the low-refractive-index layer 11.

Note that the intermediate-refractive-index region 14 according to the present embodiment has a shape of a one-dimensional diffraction grating which has a constant period.

As described above, since the first basic principle and the second basic principle are applied to the polarizer 7 according to the present embodiment, the polarizer 7 can function as a reflective polarizer which transmits only linearly polarized light which is polarized in one direction and which reflects linearly polarized light which is polarized in a direction perpendicular thereto.

In addition, the intermediate-refractive-index region 14 is secondarily and simultaneously formed when the diffraction grating 12 is formed through the use of a thermal imprinting process which will be described later. Accordingly, it could be said that such polarizer 7 according to the present embodiment using both the intermediate-refractive-index region 14 and the diffraction grating 12 has a configuration suitable for manufacture through the use of a thermal imprinting process.

Manufacturing Method

The manufacturing method of the polarizer 7 according to the present embodiment will now be described in detail.

The polarizer 7 according to the present embodiment is manufactured by two types of processes: a method of forming a multi-layered film; and a process of transferring a pattern of diffraction grating to the multi-layered film through the use of a thermal imprinting method or the like.

Specifically, first, two types of films which are formed of a high molecular weight polymer and which have different refractive indexes with each other (that is, a high-refractive-index high molecular weight film and a low-refractive-index high molecular weight film) and a thick film which has a large thickness and which serves as a film-like translucent substrate are prepared.

Various thermoplastic and thermosetting high molecular weight polymers may be used as materials for such high-refractive-index high molecular weight film, low-refractive-index high molecular weight film and thick film. The examples include polymethyl methacrylate (PMMA), cycloolefin-based, epoxy-based, polyimide-based, polycarbonate-based resins and the like.

However, in order for the polarizer 7 as one according to the present embodiment in which the convex portions 9 having the multi-layered structure are integrally formed on the substrate 8 to acquire a long-term reliability, the configuration thereof needs to have high adhesive force between each of the substrate 8, the high-refractive-index layer 10, the low-refractive-index layer 11 and the intermediate-refractive-index region 14. To achieve this configuration, it is preferable that the individual films (i.e., the high-refractive-index high molecular weight film, the low-refractive-index high molecular weight film and the thick film) be formed using polymers preferably having the same configuration (i.e., of a same type).

In the case where polymers of different types are used, it is easy to select a combination of films which have different refractive indexes. However, even in the case where polymers of a same type are used, homogeneous dispersion of inorganic particulates made of an oxide such as $Ta_2O_5$, $TiO_2$ and $Al_2O_3$ in the polymers enables controlling the refractive indexes of the films so as to select a combination of the films which have different refractive indexes. In the case where polymers of a same type are used, the polymers can have different refractive indexes from each other only by dispersing inorganic particulates which have different refractive indexes in the polymers such that, for example, the disperse amounts or the types of particles differ.

Note that an art enabling homogeneously dispersing inorganic particulates in an organic polymer is disclosed in, for example, Japanese Patent Unexamined Publication No. Heisei 6-322278, and an art enabling homogeneously dispersing inorganic particulates in a thermoplastic polymer is disclosed in, for example, Japanese Patent Unexamined Publication No. 2003-292795.

As described above, forming of the high-refractive-index high molecular weight film, the low-refractive-index high molecular weight film and the thick film by dispersing particulates in high molecular weight polymers of a same type enabling enhancing all of adhesive force between the substrate 8 and the high-refractive-index layer 10, adhesive force between the high-refractive-index layer 10 and the low-refractive-index layer 11, and adhesive force between the substrate 8 and the intermediate-refractive-index region 14, and thereby enabling manufacturing the polarizer 7 which is resistant in long-term durability tests such as a high temperature high durability test and a heat shock test.

After the high-refractive-index high molecular weight film, the low-refractive-index high molecular weight film and the thick film are prepared as described above, the high-refractive-index high molecular weight film and the low-refractive-index high molecular weight film are laminated onto the thick film sequentially and repeatedly. When they are laminated, the films may be bonded with an adhesive.

Note that the film thickness (physical film thickness) of the high-refractive-index high molecular weight film and the film thickness of the low-refractive-index high molecular weight film need be adjusted in advance so that they have equal optical film thickness, using the difference in refractive index therebetween. However, in the stage where the high-refractive-index high molecular weight films and the low-refractive-index high molecular weight films are laminated onto the thick film, the optical film thickness of the high-refractive-index high molecular weight film and the optical film thickness of the low-refractive-index high molecular weight film need not be set to one fourth of the wavelengths of light to be used, respectively. Specifically, the optical film thickness of the high-refractive-index high molecular weight film and the optical film thickness of the low-refractive-index high molecular weight film may be made to one fourth of the wavelengths of light to be used respectively by heating and applying pressure in the thickness direction on the thick film in the state where the high-refractive-index high molecular weight films and the low-refractive-index high molecular weight films have been laminated thereon.

Figure 6:
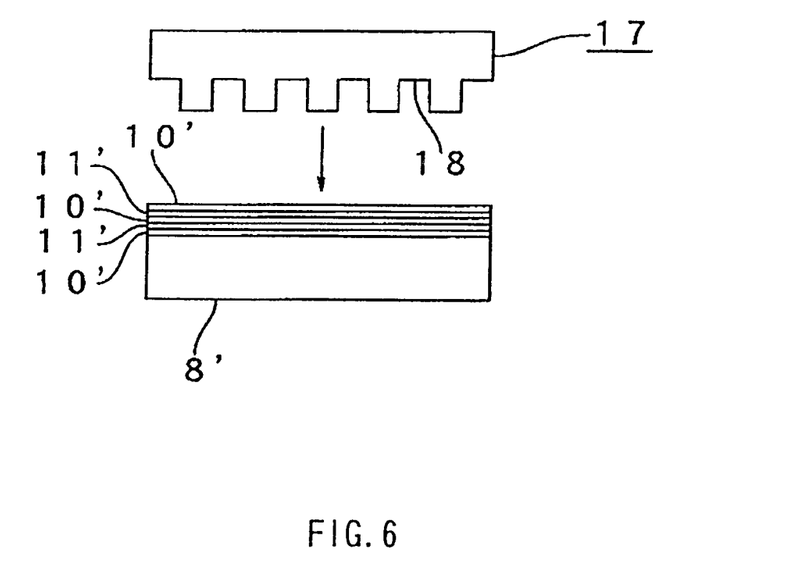
FIG. 6 is a process drawing showing a state in which a thick film is arranged below a mold in an embodiment of a manufacturing method of a polarizer according to the present invention.

Subsequently, as shown in FIG. 6, a thick film 8' on which high-refractive-index high molecular weight films 10' and low-refractive-index high molecular weight films 11' are sequentially and repeatedly laminated is arranged below a mold 17 for a thermal imprinting process.

The mold 17 herein has a plurality of concave portions 18 which have a period shorter than the wavelength of light to be used on a surface of a metal such as Ni. The diffraction grating 12 is formed by transferring the pattern of the concave portions 18 to the high-refractive-index high molecular weight films 10' and the low-refractive-index high molecular weight films 11' on the thick film 8'.

Note that such mold 17 can be obtained, for example, by forming a master pattern which has an inversed convex and concave with respect to the concave portion 18 on an Si wafer through the use of a lithography process for semi-conductors such as EB lithography for resist, dry etching or the like, and subsequently executing an Ni electroforming process for the master pattern so as to transfer the master pattern to Ni.

Subsequently, the process proceeds to transfer of the pattern of the mold 17 through the use of a thermal imprinting process. Specifically, the mold 17 is heated to a temperature which is equal to or higher than the glass transition temperature of the polymer, and high pressure is applied downward to the heated mold 17, whereby the mold 17 is pressed from above onto the thick film 8' on which the high-refractive-index high molecular weight films 10' and the low-refractive-index high molecular weight films 11' are laminated.

Figure 7:
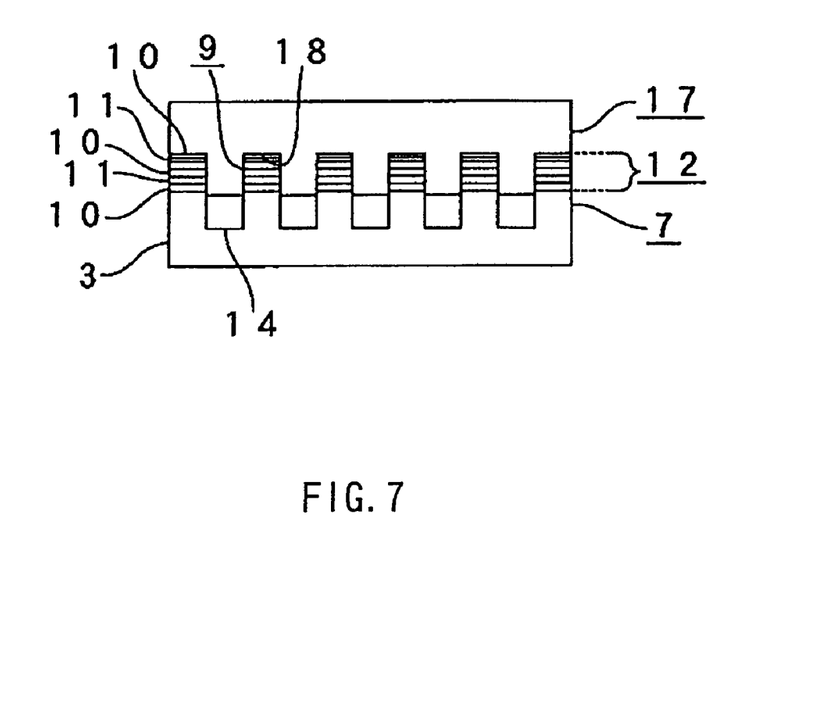
FIG. 7 is a process drawing showing a process of transferring a shape of the mold to a high-refractive-index high molecular weight film and a low-refractive-index high molecular weight film which are arranged on the thick film in the embodiment of the manufacturing method of a polarizer according to the present invention.

As a result of this, as shown in FIG. 7, in each concave portion 18 of the mold 17, the materials for the high-refractive-index high molecular weight films 10' and the low-refractive-index high molecular weight films 11' flow in the concave portion 18, whereby the pattern of the concave portion 18 is transferred. As a result of this, the convex portion 9 which has a laminated structure of the high-refractive-index layers 10 and the low-refractive-index layers 11 are formed.

At the same time, in each convex portion between the concave portions 18 of the mold 17, both films 10', 11' are pressed with high pressure so that the portions corresponding thereto are broken, and then the portions are pressed down into the thick film 8'. As a result of this, a region which is a mixture of the two films 10', 11' through the use of heat and pressure and which has a homogeneous refractive index. This region is referred to as the intermediate-refractive-index region 14 as described above, and a refractive index nM of the intermediate-refractive-index region 14 is, for example, a intermediate value nM of the refractive index nH of the high-refractive-index layer 10 and the refractive index nL of the low-refractive-index layer 11, that is, nM=(nH+nL)/2.

As described above, the polarizer 7 which includes the diffraction grating 12 made from the multi-layered structure consisting of the high-refractive-index layers 10 and the low-refractive-index layers 11 as well as the intermediate-refractive-index region 14 on the substrate 8 is formed by transferring the pattern of the mold 17.

Figure 8:
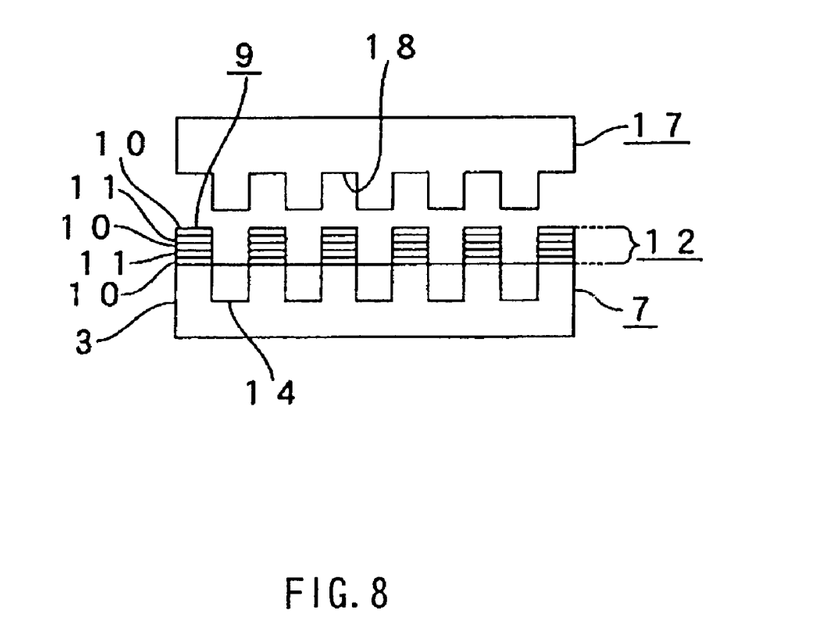
FIG. 8 is a process drawing showing a process of releasing a polarizer in the embodiment of the manufacturing method of a polarizer according to the present invention.

Subsequently, after the mold 17 is cooled down to a temperature which is lower than the glass transition temperature of the polymer, the polarizer 7 is released from the mold 17 by being pulling up upward, as shown in FIG. 8.

In this case, there are some cases where the film material which flows into the concave portions 18 of the mold 17 adheres to the mold 17 and thus it is difficult to release the mold. To prevent this, a resin release agent may be applied on the mold 17 in advance so as to facilitate mold release. An example of such release agents is Optool DXF (registered trade name) manufactured by Daikin Industries.

As described above, according to the present embodiment, since the polarizer 7 can be manufactured quickly through the use of a thermal imprinting process using the mold 17, mass productivity can be enhanced. In addition, since the equipment used for such thermal imprinting process is inexpensive compared to the equipment used for manufacturing a wire grid polarizer as described previously, a manufacturing cost can be reduced. In addition, according to the present embodiment, by since the polarizer 7 is formed utilizing pressing of the films 10', 11' by the mold 17, all of adhesive force between the substrate 8 and the high-refractive-index layer 10, adhesive force between the high-refractive-index layer 10 and adhesive force between the low-refractive-index layer 11 and adhesive force between the substrate 8 and the intermediate-refractive-index region 14 can be enhanced. Note that such adhesive force can be further enhanced by forming the high-refractive-index high molecular weight film 10', the low-refractive-index high molecular weight film 11' and the thick film 8' using polymers of a same type, as described previously.

EXAMPLES

First Example

First Example of the polarizer according to the present invention will now be described. The polarizer 7 according to the present Example satisfies the conditions shown in the Polarizer Data below.

Polarizer Data $\lambda=650$ nm, $\Lambda=400$ nm, $f=0.5$, $nS=1.5145$, $nL=1.51$, $nM=1.56$, $nH=1.61$, $tM=8.22\,\mu m$, $tH=0.1153\,\mu m$, $tL=0.1230\,\mu m$, $m=69$ layers Herein, $\lambda$ in the polarizer data represents the wavelength of light to be used (center wavelength). In addition, $\Lambda$ represents the period size of the diffraction grating 12 of the polarizer 7. Further, f represents the filling ratio of the diffraction grating 12. Still further, nS represents the refractive index of the substrate 8. In addition, nL represents the refractive index of the low-refractive-index layer 11. Further, nM represents the refractive index of the intermediate-refractive-index region 14. Still further, nH represents the refractive index of the high-refractive-index layer 10. In addition, tM represents the film thickness of the intermediate-refractive-index region 14. Further, tH represents the film thickness of the high-refractive-index layer 10. Still further, tL represents the film thickness of the low-refractive-index layer 11. In addition, m represents the number of layers (the total number of layers) of the multi-layered films 10, 11 on the substrate 8. That is, in the present Example, the number of layers of the high-refractive-index layer 10 is 35, and the number of layers of the low-refractive-index layer 11 is 34.

Note that when the numbers of layers of the multi-layered films 10, 11 are counted, the high-refractive-index layer 10 which serves as the lowermost layer of the convex portion 9 is regarded as the first layer and the high-refractive-index layer 10 which serves as the uppermost layer of the convex portion 9 is regarded as the 69th layer.

In addition, in the polarizer data, the film thickness tM of the intermediate-refractive-index region 14 is equal to the total film thickness of the multi-layered films 10, 11, that is, from Layer 1 to Layer 69, that constitute each convex portion 9. However, this is not always applied to the reflective polarizer 7 according to the present Example.

Still further, in the polarizer data, the film thickness of each thin film layer is adjusted such that the center wavelength at which the polarizer 7 works is 650 nm.

The polarizer 7 of the present Example herein can be understood optically as one of diffraction gratings of a sub-wavelength size which is formed of a multi-layered film. In addition, the expected characteristics can be calculated using the RCWA method which is often used for calculating the diffraction grating characteristics of a sub-wavelength. The calculation method according to the RCWA method is described in J. Opt. Soc. Am. A, vol.12, no5, pp1068-1076, May, 1995.

Figure 9:
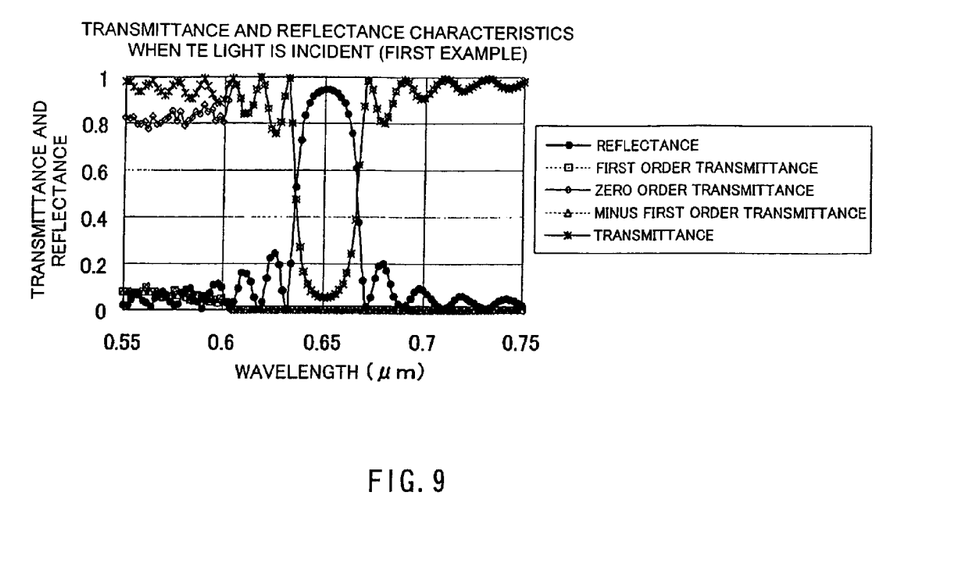
FIG. 9 is a graph showing transmittance and reflectance characteristics for a polarizer according to First Example when TE light is incident thereto.
Figure 10:
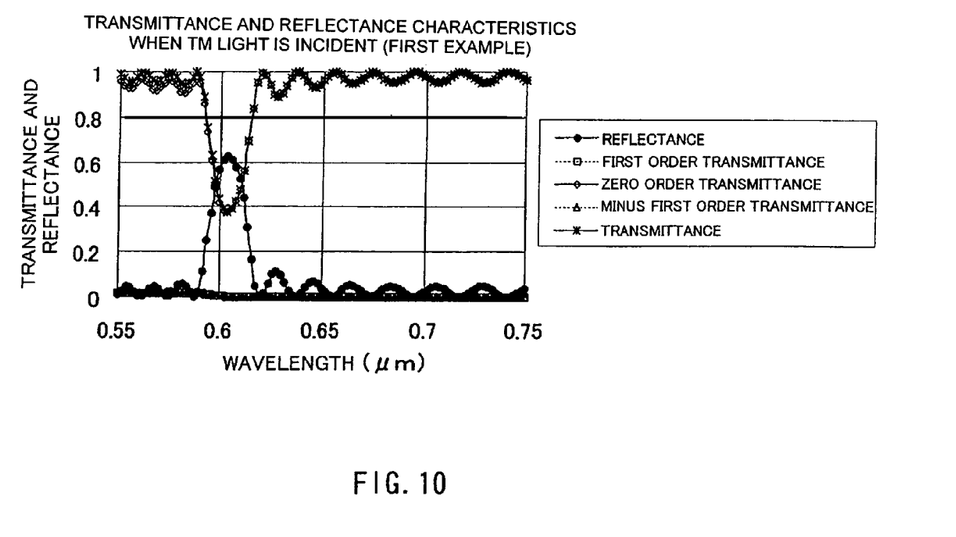
FIG. 10 is a graph showing transmittance and reflectance characteristics for the polarizer according to First Example when TM light is incident thereto.

Calculation of the characteristics of the polarizer 7 according to the present Example using such RCWA method lead to the calculation results as shown in FIG. 9 and FIG. 10. FIG. 9 shows transmittance and reflectance characteristics in the range of 550 to 750 nm when linearly polarized light in the TE mode is incident to the polarizer 7. In addition, FIG. 10 shows transmittance and reflectance characteristics in the range of 550 to 750 nm when linearly polarized light in the TM mode is incident to the polarizer 7.

Note that in the calculation using the RCWA method; the number of expansion terms for Fourier series expansion of the refractive index and the permittivity was 15.

As understood from FIG. 9, reflectance of the TE light shows the maximum 94.6% at 650 nm. In addition, as understood from FIG. 10, the TM mode light is substantially transmitted at 650 nm. The transmittance and reflectance of the TE light and TM light at 650 nm are as shown below:

Transmittance of TE light: 5.40%, reflectance of TE light: 94.6%

Transmittance of TM light: 96.2%, reflectance of TM light: 3.80%

It is found herein that plus or minus first-order diffraction light is generated in the vicinity of 600 nm or less for transmitted light. This, however, does not cause any practical inconvenience because the performance in the vicinity of 650 nm is herein taken into consideration.

In the meantime, other than the transmittance and reflectance characteristics as described above, the extinction ratio as shown in the following Equations (3) and (4) is known as a general parameter expressing the performance of the polarizer. These equations are described in Handbook of Optics (Vol. I, 5-13).

$$Et = -10 \cdot \log(Ts/Tp) \quad (3)$$

$$Er = -10 \cdot \log \cdot (Rs/Rp) \quad (4)$$

Note that in Equation (3), Et represents the extinction ratio for transmitted light, Ts represents transmittance when linearly polarized light which is parallel to the transmission axis of the polarizer 7 is incident to the polarizer 7, and Tp represents transmittance when linearly polarized light which is perpendicular to the transmission axis of the polarizer 7 is incident to the polarizer 7. In addition, in Equation (4), Er represents the extinction ratio for reflected light, Rp represents reflectance when linearly polarized light which is parallel to the transmission axis of the polarizer 7 is incident to the polarizer 7, and Rs represents reflectance when linearly polarized light which is perpendicular to the transmission axis of the polarizer 7 is incident to the polarizer 7.

The polarizer 7 according to the present Example showed the extinction ratio for transmitted light 12.5 dB, and the extinction ratio for reflected light 13.9 dB, which was substantially satisfactory.

Second Example

Second Example of the polarizer according to the present invention will now be described as a more preferable Example. The polarizer 7 according to the present Example satisfies the conditions shown in Polarizer Data below.

Polarizer Data $\lambda$=650 nm, $\Lambda$=400 nm, f=0.5, nS=1.5145, nL=1.51, nM=1.56, nH=1.61, tM=13.03 μm, tH=0.1153 μm, tL=0.1229 μm, m=125 layers In addition, in the polarizer data, the film thickness tM of the intermediate-refractive-index region 14 is equal to the total film thickness of the multi-layered films 10, 11, that is, from Layer 1 to Layer 69, that constitutes each convex portion 9. However, this is not always applied to the reflective polarizer 7 according to the present Example.

Figure 11:
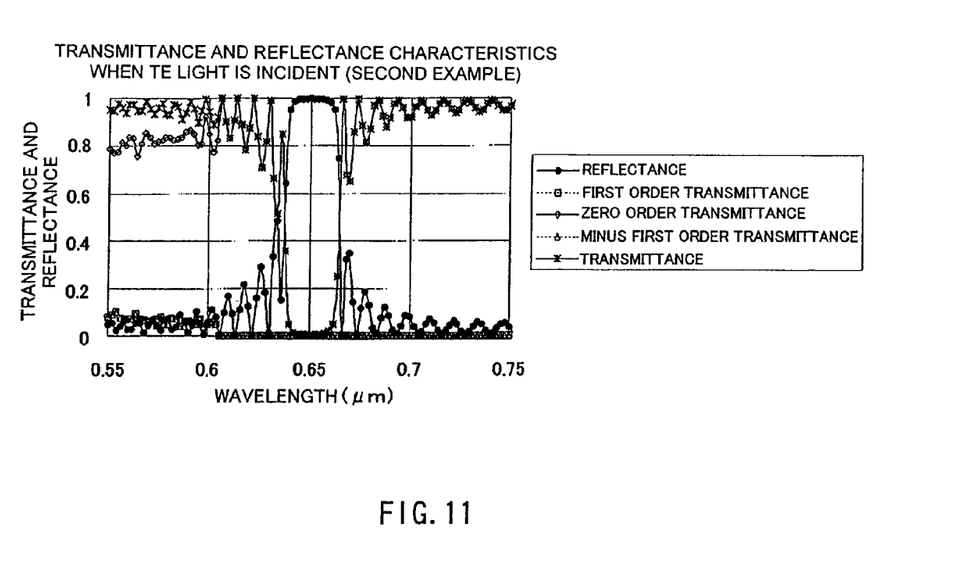
FIG. 11 is a graph showing transmittance and reflectance characteristics for a polarizer according to Second Example when TE light is incident thereto.
Figure 12:
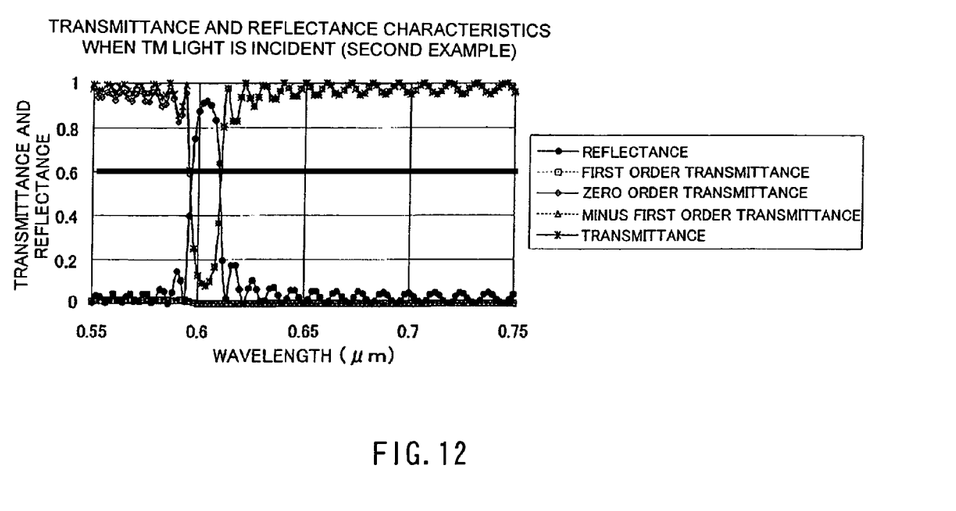
FIG. 12 is a graph showing transmittance and reflectance characteristics for the polarizer according to Second Example when TM light is incident thereto.

Calculation of the characteristics of such polarizer 7 according to the present Example using the RCWA method lead to the calculation results as shown in FIG. 11 and FIG. 12. FIG. 11 shows transmittance and reflectance characteristics in the range of 550 to 750 nm when linearly polarized light in the TE mode is incident to the polarizer 7. In addition, FIG. 12 shows transmittance and reflectance characteristics in the range from 550 to 750 nm when linearly polarized light in the TM mode is incident to the polarizer 7.

The transmittance and reflectance of the TE light and TM light at 650 nm are as shown below:

Transmittance of TE light: 0.213%, reflectance of TE light: 99.78%

Transmittance of TM light: 99.93%, reflectance of TM light: 0.066%

As understood also from the calculation result, the present Example enables providing still better performance than First Example. This is thought to be due to the number of layers of the high-refractive-index layers 10 and the low-refractive-index layers 11 that constitute the convex portion 9 is larger than those of First Example.

Figure 13:
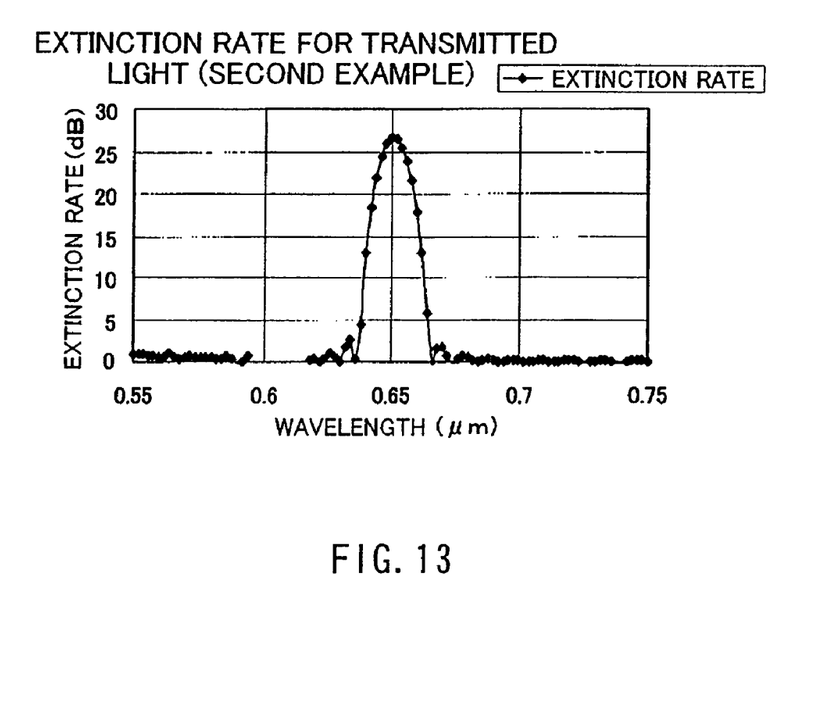
FIG. 13 is a graph showing wavelength dependency of an extinction ratio for transmission for the polarizer according to Second Example.
Figure 14:
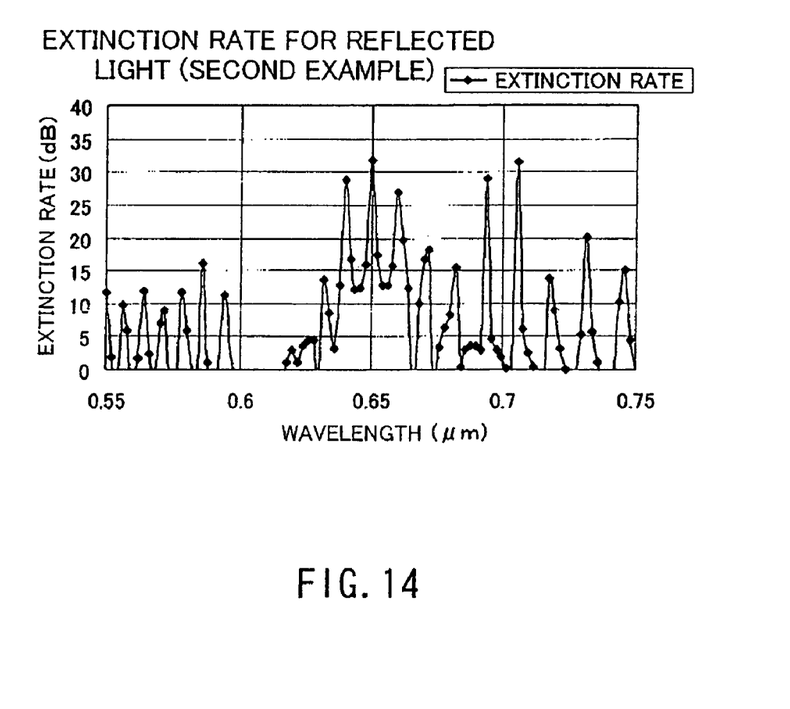
FIG. 14 is a graph showing wavelength dependency of the extinction ratio for reflection for the polarizer according to Second Example.

Next, calculation of wavelength dependency of the extinction ratio of transmission and reflection for the polarizer 7 of the present Example lead to the calculation results as shown in FIG. 13 and FIG. 14.

As shown in FIG. 13 and FIG. 14, the polarizer 7 according to the present Example showed the extinction ratio for transmitted light 26.7 dB, and the extinction ratio for reflected light 31.89 dB at the light wavelength 650 nm, which was a still better result that that of First Example.

Third Example

Third Example of the polarizer according to the present invention will now be described. The polarizer 7 according to the present Example satisfies the conditions shown in Polarizer Data.

Polarizer Data $\lambda$=650 nm, $\Lambda$=400 nm, f=0.5, nS=1.5145, nL=1.51, nM=1.56, nH=1.61, tM=12 μm, tH=0.1153 μm, tL=0.1229 μm, m=125 layers Unlike Second Example, the thin film thickness tM of the intermediate-refractive-index region 14 of the polarizer 7 according to the present Example is thinner than the total film thickness of the multi-layered films 10, 11, that is, from Layer 1 to Layer 125 that constitute each convex portion 9.

Figure 15:
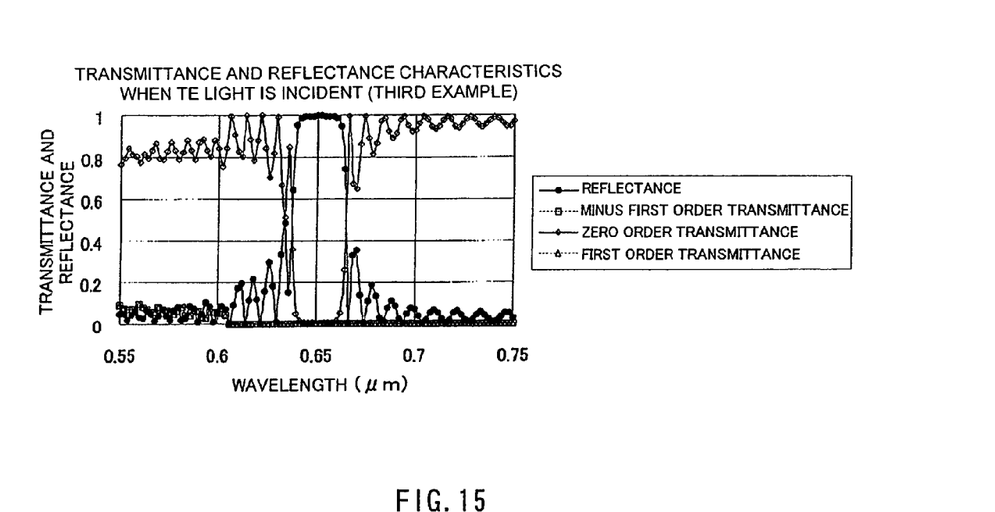
FIG. 15 is a graph showing transmittance and reflectance characteristics for a polarizer according to Third Example when TM light is incident thereto.
Figure 16:
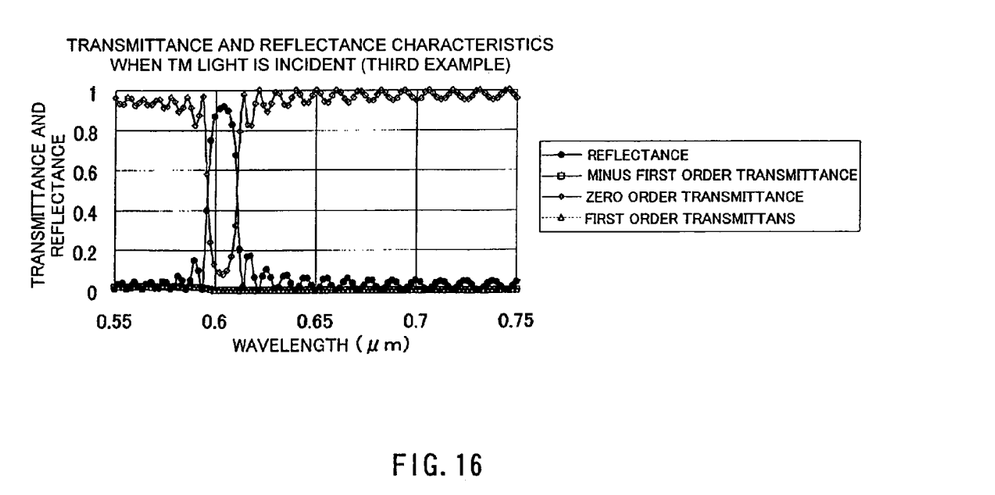
FIG. 16 is a graph showing transmittance and reflectance characteristics for the polarizer according to Third Example when TE light is incident.

Calculation of the characteristics of such polarizer 7 according to the present Example using the RCWA method lead to the calculation results as shown in FIG. 15 and FIG. 16. FIG. 15 shows transmittance and reflectance characteristics in the range of 550 to 750 nm when linearly polarized light in the TE mode is incident to the polarizer 7. In addition, FIG. 16 shows transmittance and reflectance characteristics in the range from 550 to 750 nm when linearly polarized light in the TM mode is incident to the polarizer 7.

These graphs indicate that there is no significant difference in characteristics in the vicinity of the center wavelength (650 nm) from Second Example, despite some difference in the ripple of reflectance at lower wavelengths. Accordingly, it is found that fluctuation in the film thickness of the intermediate-refractive-index region 14 to some extent is not of much importance.

As described above, the present invention enables manufacturing a reflective polarizer of high performance inexpensively and easily through the use of a thermal imprinting process.

Note that the present invention is not limited to the embodiment as described above, and various modifications are possible as necessary.

For example, in the embodiment as described above, all portions of the intermediate-refractive-index region 14 except the top surface 14*a* thereof are buried in the substrate 8 from the surface thereof. However, the intermediate-refractive-index region 14 may be formed such that a portion having a predetermined range on the top surface 14*a* side protrudes from the surface of the substrate 8, depending on the pressing force of the mold, the number of layers of the high-refractive-index layers 10 and the low-refractive-index layers 11 that constitute the convex portion, or the like.

What is claimed is:

1. A polarizer comprising:
a translucent substrate;
a diffraction grating which is formed on the translucent substrate, which has a plurality of convex portions that are aligned so as to have a frequency which is equal to or less than a wavelength to be used, and wherein each of the plurality of is made from an alternating layer consisting of high-refractive-index layers and low-refractive-index layers; and
an intermediate-refractive-index region which is formed so as to have a portion, which, with a top surface thereof being exposed, is entirely buried except for the exposed top surface in said translucent substrate at a position between said convex portions that are adjacent to each other in the diffraction grating, said intermediate-refractive-index region having a refractive index which is higher than a refractive index of said low-refractive-index layer and which is lower than a refractive index of said high-refractive-index layer.

2. The polarizer according to claim 1, wherein
both a lowermost layer and an uppermost layer of said convex portion are said high-refractive-index layers.

3. The polarizer according to claim 1 or 2, wherein
said translucent substrate, said high-refractive-index layer, said low-refractive-index layer and said intermediate-refractive-index region are formed from a same high molecular weight polymer.

4. A polarizer comprising:
a translucent substrate;
a diffraction grating formed on the translucent substrate of alternately and repeatedly laminated a high-refractive-index and a low-refractive-index films, said diffraction grating having a plurality of convex portions that are aligned so as to have a frequency which is equal to or less than a wavelength to be used, and wherein each of the plurality of convex portions is made from an alternating layer consisting of high-refractive-index layers and low-refractive-index, layers; and
an intermediate-refractive-index region which is formed between said convex portions that are adjacent to each other in the diffraction grating, and which has a refractive index which is higher than a refractive index of said low-refractive-index layer and which is lower than a refractive index of said high-refractive-index layer, said intermediate-refractive-index region, with a top surface thereof exposed, being buried, except for the exposed top surface, in said translucent substrate, and comprising a mixture of the high-refractive-index film and the low-refractive-index film.

\* \* \* \* \*